United States Patent [19]

Koukal et al.

[11] 4,407,167

[45] Oct. 4, 1983

[54] SLIDING GUIDE MECHANISM

[75] Inventors: Heinz Koukal, Sindelfingen; Hermann Grimm, Ostelsheim, both of Fed. Rep. of Germany

[73] Assignee: Daimler-Benz Aktiengesellschaft, Stuttgart, Fed. Rep. of Germany

[21] Appl. No.: 186,732

[22] Filed: Sep. 12, 1980

[30] Foreign Application Priority Data

Sep. 12, 1979 [DE] Fed. Rep. of Germany ....... 2936817

[51] Int. Cl.³ .............................. F16C 1/14; F16C 1/22
[52] U.S. Cl. .................................................. 74/501 R
[58] Field of Search ............ 74/501 R, 501 M, 501 P, 74/502

[56] References Cited

U.S. PATENT DOCUMENTS

| | | | |
|---|---|---|---|
| 1,276,116 | 8/1918 | Riebe | 74/501 R X |
| 1,559,306 | 10/1925 | Berkman | 74/502 |
| 2,386,767 | 10/1945 | Arens | 74/502 |
| 2,439,356 | 4/1948 | Arens | 74/501 M |
| 3,247,722 | 4/1966 | Jacobson | 74/501 M |
| 3,513,719 | 5/1970 | Tschanz | 74/501 P |
| 4,088,040 | 5/1978 | Ross-Myring | 74/501 R |

FOREIGN PATENT DOCUMENTS

| | | |
|---|---|---|
| 2339643 | 2/1975 | Fed. Rep. of Germany . |
| 2460414 | 6/1976 | Fed. Rep. of Germany ... 74/501 M |
| 780002 | 4/1935 | France .............................. 74/501 R |
| 974945 | 2/1951 | France .................................. 74/502 |

*Primary Examiner*—Rodney H. Bonck
*Attorney, Agent, or Firm*—Craig & Burns

[57] ABSTRACT

A sliding guide member which includes a sliding member accommodating one end of flexible cable assembly which is adapted to transmit tensile and compressive forces. The end zone of the sliding member in proximity of the cable assembly, which zone is slidingly movably guided within a fixed guide sleeve, is constructed to be offset with respect to the remaining zone in which is accommodated an adjusting element for the sliding guide mechanism. The guided end zone of the sliding member has an approximately spherical shape and includes a bore for a suspension mounting of an end of the flexible cable assembly, which end is provided with a ball element. The sliding member is provided with a threaded bore extending in the axial direction for accommodating the adjusting element, which is equipped with an external thread so as to enable a coupling of the adjusting element to the sliding member.

8 Claims, 1 Drawing Figure

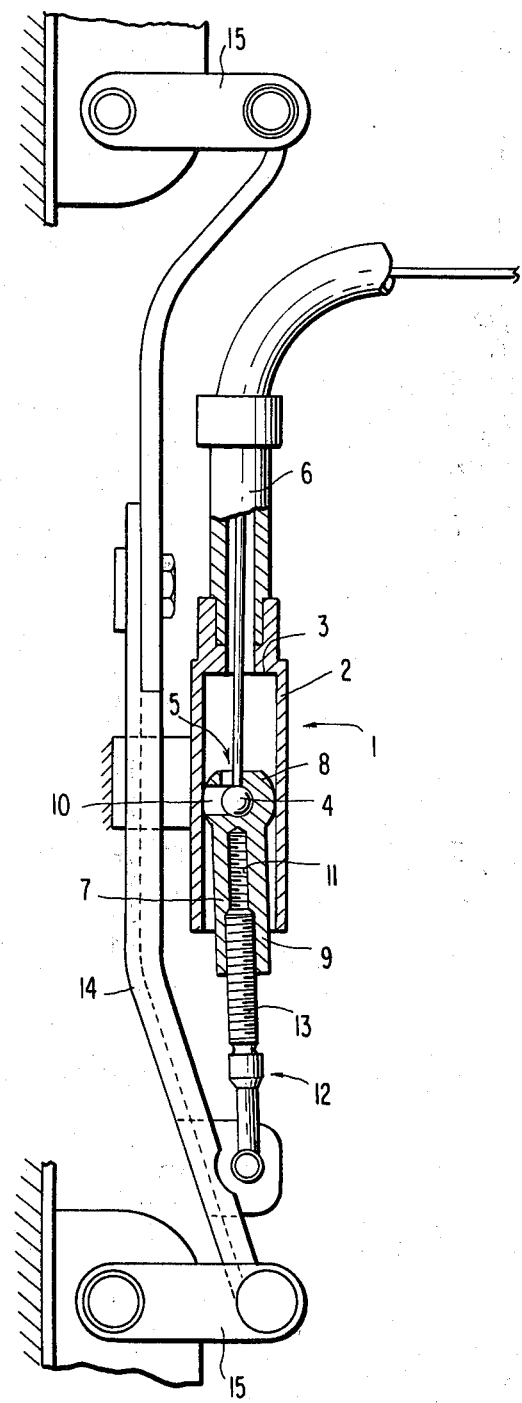

SLIDING GUIDE MECHANISM

The present invention relates to a guide mechanism and, more particularly, to a sliding guide mechanism which includes a sliding member accommodating one end of a flexible cable assembly for transmitting tensile and compressive forces wherein an end zone of the sliding member in the proximity of the cable, which end zone is slidingly movably guided within a fixed guide sleeve, is fashioned of a stepped configuration with respect to the remaining zone and which is equipped with an adjusting element.

A sliding guide mechanism of the aforementioned type is proposed in, for example, Offenlegungsschrift No. 23 39 643, which such proposed mechanism serving to translate pivotal motions introduced through adjusting elements in the form of gear members into a linear motion and for transmitting such linear motion.

It is customary in the construction of motor vehicles to effect adjustment of, for example, flaps, valves, or the like from a dashboard of the motor vehicle and to impart adjusting motion to an adjusting or operating element through a flexible cable transmitting tensile and compressive forces. One difficulty encountered is that the attachment of the cable to the adjusting element becomes somewhat difficult especially if relatively large pivotal motions must be generated and if the power necessary for an adjustment is relatively large since it can then happen that the motion transmitting wire or cable breaks off due to an insufficient guidance in the zone of connection or attachment of the cable system to the adjusting element.

Further problems frequently occur with respect to adapting a length of wire to a specific application since the mounting elements of the clamping devices provided for this purpose are frequently poorly accessible and any compensation necessary for rather small tolerances can be effected only with considerable expenditures.

The aim underlying the present invention essentially resides in providing a sliding guide mechanism which includes a sliding member and guide sleeve which is constructed in such a manner that even relatively large pivotal motions which require great force or power can be effected while nevertheless attaining an easy adjustability of the guide mechanism.

In accordance with the advantageous features of the present invention, a sliding guide mechanism of the aforementioned type is proposed wherein a guided end zone of the sliding member is constructed so as to be approximately spherical and is provided with a bore for suspending therein an end of the flexible cable, which end is provided with a ball. Advantageously, the sliding member is provided with a threaded bore which penetrates into the remaining zone in an axial direction, for accommodating an adjusting element provided with an external thread.

Due to the provision of an approximately spherical configuration of the end zone of the sliding member, such end zone adapts itself automatically, through the adjusting element, to the respective angular position whereby the operating forces necessary are substantially reduced. Moreover, in accordance with the present invention, a sensitive adjustment of the length of the transmission path is provided in the mounted condition of the sliding guide mechanism due to the fact that the sliding member may be rotated if it is an appropriate position, with the rotary movement being transmitted to the adjusting element along the lines of shortening or lengthening of the transmission path. With this adjusting motion, the cable is not concomitantly turned due to the special construction of the end of the flexible cable.

Accordingly, it is an object of the present invention to provide a sliding guide mechanism which avoids, by simple means, shortcomings and disadvantages encountered in the prior art.

Another object of the present invention resides in providing a sliding guide mechanism which enables a substantial reduction in forces necessary to operate the same.

A further object of the present invention resides in providing a sliding guide mechanism which is simple in construction and therefore relatively inexpensive to manufacture.

A still further object of the present invention resides in providing a sliding guide mechanism which facilitates an attachment thereof to a transmission cable system.

Yet another object of the present invention resides in providing a sliding guide mechanism which functions reliably under all operating conditions.

These and other objects, features and advantages of the present invention will become more apparent from the following description when taken in connection with the accompanying drawing which shows, for the purposes of illustration only, one embodiment in accordance with the present invention, and wherein:

The single FIGURE of the drawing is a partial cross-sectional view of a sliding guide mechanism in accordance with the present invention.

Referring now to the single FIGURE of the drawing, according to this FIGURE, a sliding guide mechanism generally designated by the reference numeral 1 includes a guide sleeve 2 having a bottom zone 3 which is fixedly held in a conventional manner not illustrated in detail. An end generally designated by the reference numeral 5 of a flexible cable system 6 extends into the bottom zone 3. The cable system 6 is adapted to transmit tensile and compressive forces and is provided at the end 5 with a ball element 4. The bottom zone 3 receives a sliding member 7 which contains two zones 8, 9.

The zone 8 forms a guided end zone and has an approximately spherical shape. A mounting bore is provided in the zone 8 for enabling a hanging or suspending of the ball element 4 of the cable system 6. The remaining zone 9 of the sliding member 7 has smaller outer dimensions than zone 8 to allow clearance for a rocking motion of sliding member 7 as it moves within guide sleeve 2. Sliding member 7 is provided with an internal threaded bore 11 which extends in the axial direction of the sliding member 7. An adjusting element generally designated by the reference numeral 12 is provided with an external thread 13 which is adapted to cooperate with the internal thread in the bore 11. The adjusting element 12 projects into the bore 11 and is articulated to an operating bridge 14 which acts on an end side of sliding parts 15 for controlling a positioning thereof.

In the illustrated central position or in a left-hand position (not shown) of the sliding member 7, the sliding member 7 may be turned whereby, depending upon the direction of turning, an effective length of the adjusting element can be shortened or lengthened. In this connection, very small adjusting motions can be effected which, due to the spherical configuration of the ball element 4 at the end 5, are not transmitted as rotary motion to the wires of the cable system 6.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A sliding guide mechanism which includes a flexible cable means for transmitting tensile and compressive forces, a sliding member having at least one end zone which is slidingly movably guided in a fixed guide sleeve, characterized in that at least the end zone of the sliding member has an approximately spherical shape, a bore means is provided in the end zone of the sliding member for enabling a suspension mounting of an end of the flexible cable means, and in that an axially extending bore means is provided in a remaining zone of the sliding member for enabling a coupling of the sliding member to an adjusting element for adjusting the slide guide means.

2. A sliding guide mechanism according to claim 1, characterized in that the remaining zone of the sliding member is of smaller outer dimensions with respect to the end zone.

3. A sliding guide mechanism according to one of claims 1 or 2, characterized in that the axially extending bore means is provided with an internal threading adapted to cooperate with an external threading provided on the adjusting element so as to threadably couple the sliding member to the adjusting element.

4. A sliding guide mechanism according to claim 3, characterized in that the end of the flexible cable means is provided with a ball means adapted to be accommodated in the bore means in the end zone of the sliding member.

5. A sliding guide mechanism for a flexible cable comprising
guide sleeve means for receiving the end of the flexible cable with a bottom zone,
an adjusting element, and
means having an approximately spherical shape engaging the sides of the bottom zone for connecting the adjusting element to the end of the flexible cable for rocking and nonlinear movement within the bottom zone.

6. A sliding guide mechanism as set forth in claim 5, comprising
ball means fixed to the end of the flexible cable disposed in a mounting bore for attachment to the means for connecting.

7. A sliding guide mechanism as set forth in claim 5, wherein the adjusting element comprises
means for engaging by threads the means for connecting.

8. A sliding guide mechanism for a flexible cable comprising
guide sleeve means for receiving the end of the flexible cable within a bottom zone,
an adjusting element,
means for connecting the adjusting element to the end of the flexible cable for rocking and nonlinear movement within the bottom zone,
wherein the means for connecting comprises
spherical means having a diameter D for engaging the sides of the bottom zone and
means having a cross sectional dimension perpendicular to the direction of sliding which is less than D for providing said rocking and nonlinear movement of said adjusting element.

* * * * *